United States Patent
Carey, Jr. et al.

(10) Patent No.: US 8,776,162 B2
(45) Date of Patent: Jul. 8, 2014

(54) PLUG AND PLAY FIBER DISTRIBUTION HUB

(75) Inventors: John L. Carey, Jr., Haymarket, VA (US); Marcus A. Staley, Temple Terrace, FL (US); George N. Bell, Stormville, NY (US); Jesse Saenz, Grapevine, TX (US)

(73) Assignees: Verizon Services Organization Inc., Irving, TX (US); Verizon Services Corp., Ashburn, VA (US); Verizon Patent and Licensing Inc., Basking Ridge, NJ (US)

( * ) Notice: Subject to any disclaimer, the term of this patent is extended or adjusted under 35 U.S.C. 154(b) by 1485 days.

(21) Appl. No.: 11/475,246

(22) Filed: Jun. 27, 2006

(65) Prior Publication Data
US 2007/0300278 A1 Dec. 27, 2007

(51) Int. Cl.
*H04N 7/22* (2006.01)

(52) U.S. Cl.
USPC ............... 725/119; 385/135; 254/134.3

(58) Field of Classification Search
USPC ............... 725/119, 127, 129; 385/135
See application file for complete search history.

(56) References Cited

U.S. PATENT DOCUMENTS

| | | | | |
|---|---|---|---|---|
| 5,394,503 A | * | 2/1995 | Dietz et al. | 385/135 |
| 6,149,313 A | * | 11/2000 | Giebel et al. | 385/59 |
| 2006/0233506 A1 | * | 10/2006 | Noonan et al. | 385/134 |
| 2007/0031100 A1 | * | 2/2007 | Garcia et al. | 385/135 |
| 2007/0189691 A1 | * | 8/2007 | Barth et al. | 385/135 |
| 2007/0286411 A1 | * | 12/2007 | King et al. | 379/442 |

OTHER PUBLICATIONS

Abendschein, F.H.; Plotts, A.E., "Recent advances in fiber-optic backplane connectors," Electronic Components & Technology Conference, 1998. 48th IEEE, vol., No., pp. 790-793, May 25-28, 1998.*

* cited by examiner

*Primary Examiner* — Scott Beliveau
*Assistant Examiner* — Christine Kurien

(57) ABSTRACT

Methods and apparatus are provided for delivery of telecommunications data over fiber. In one exemplary embodiment, there is provided a fiber distribution hub including a distribution panel mounts, and the distribution panel mounts are configured to receive distribution panels, while the distribution panels are configured for establishing a connection between a feeder cable and a distribution cable, and at least one of the distribution panel mounts is not attached to a distribution panel.

12 Claims, 11 Drawing Sheets

PLUG AND PLAY FIBER DISTRIBUTION HUB

I. BACKGROUND

Various technologies exist for connecting homes and offices to communications service providers such as telephone service providers, cable television providers, and internet providers. For many years, simple copper wire was used to provide telephone service to homes and offices, and this infrastructure is still used for deploying telephone and internet services to some customers. More recently, coaxial cable has been used for communications, first to deliver television content and later to provide internet services.

Fiber optic cable is the next step in the evolution of communications technology. Fiber possesses substantial advantages over copper wire, including faster connections and higher-fidelity signals. However, fiber has not been extensively deployed directly to homes and offices, due largely to the fact that fiber has been relatively expensive. Instead, until recently, fiber has been mainly used for long-distance networks, or for "backbone" networks which connect smaller local or regional networks together.

Fiber costs have steadily declined, however, and has become a feasible alternative to coaxial cable and copper wire for delivery of telecom services directly to a home or office. Such "Fiber-to-the-premises" (FTTP) has been deployed in some areas, with service providers deploying "triple play" communications packages including telephone, television, and broadband internet access over such fiber connections.

Two competing technologies have emerged in the deployment of FTTP: "Active FTTP," which requires powered electrical components to propagate and route signals to the proper location, and "Passive Optical Networks (PONs)" which use passive "optical splitters" to route signals to the proper location.

In the typical PON, residences or offices, i.e. subscriber buildings, are connected to the communication service provider's "central office," which, in turn, is connected to a backbone network. In order to connect subscriber buildings to the central office, a fiber cable known as a "feeder cable" runs from the central office to the neighborhood, and is physically connected to one or more "fiber distribution hubs."

Inside each fiber distribution hub, one or more "splitter chassis" are connected to the feeder cable. The splitter chassis contains optical splitters for routing data to and from different subscriber buildings. When a new subscription requires a building to be connected to the fiber network, one of the optical splitters is connected to a "distribution panel" to enable service to the building. The distribution panel is, in turn, connected to the building through a "distribution cable."

In many instances, the number of fiber connections in a given area is relatively small, but the network must accommodate new fiber connections as they are added. When a housing development is built, for example, it is desirable to provide an infrastructure for delivering fiber services to homes within the development. This can be accomplished by choosing a fiber distribution hub of the appropriate size to provide service to the homes anticipated to be built in the development, and connecting the buildings in the development to the distribution panels in the fiber distribution hub as the homes are built. However, this approach can be problematic, because fiber distribution hubs can be costly.

One significant factor contributing to the up-front cost of current fiber distribution hubs is the cost of the distribution panels and the optical components therein. At present, fiber distribution hubs are assembled fully populated with distribution panels. Thus, the initial cost of a fiber distribution hub includes the cost of all the optical components installed in the distribution panels. Higher-capacity hubs have higher initial costs, largely due to the optical components in the distribution panels.

In the housing development example discussed above, if the development is built over a three year period of time, for example, not all fiber connections need to be made in the initial phase of construction. Accordingly, there is no need for a fully populated distribution hub at that time. In addition to the "wasted" capacity of a hub, optical component costs generally decline over time. Accordingly, purchasing a fiber distribution hub to meet the planned development size is generally more costly at the outset than it would be if the purchase of optical components within the hub could be delayed until a connection is actually needed. Finally, if the development is not completely finished, it is likely that a fiber distribution hub chosen to meet the planned size of the development will be too large, resulting in a sunk cost that is difficult to recover.

Therefore, it is desirable to provide a fiber distribution hub which reduces the initial cost of deploying fiber services. It is further desirable to provide expandable fiber distribution hubs, so that more subscribers can be connected to existing hubs without having to add or replace entire fiber distribution hubs.

II. BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings, FIG. 1 illustrates a block diagram of an exemplary fiber network, consistent with certain aspects related to the present invention;

III. DETAILED DESCRIPTION

Reference will now be made in detail to the preferred exemplary embodiments of the invention, examples of which are illustrated in the accompanying drawings. Wherever possible, the same reference numbers will be used throughout the drawings to refer to the same or like parts.

Figure 1:
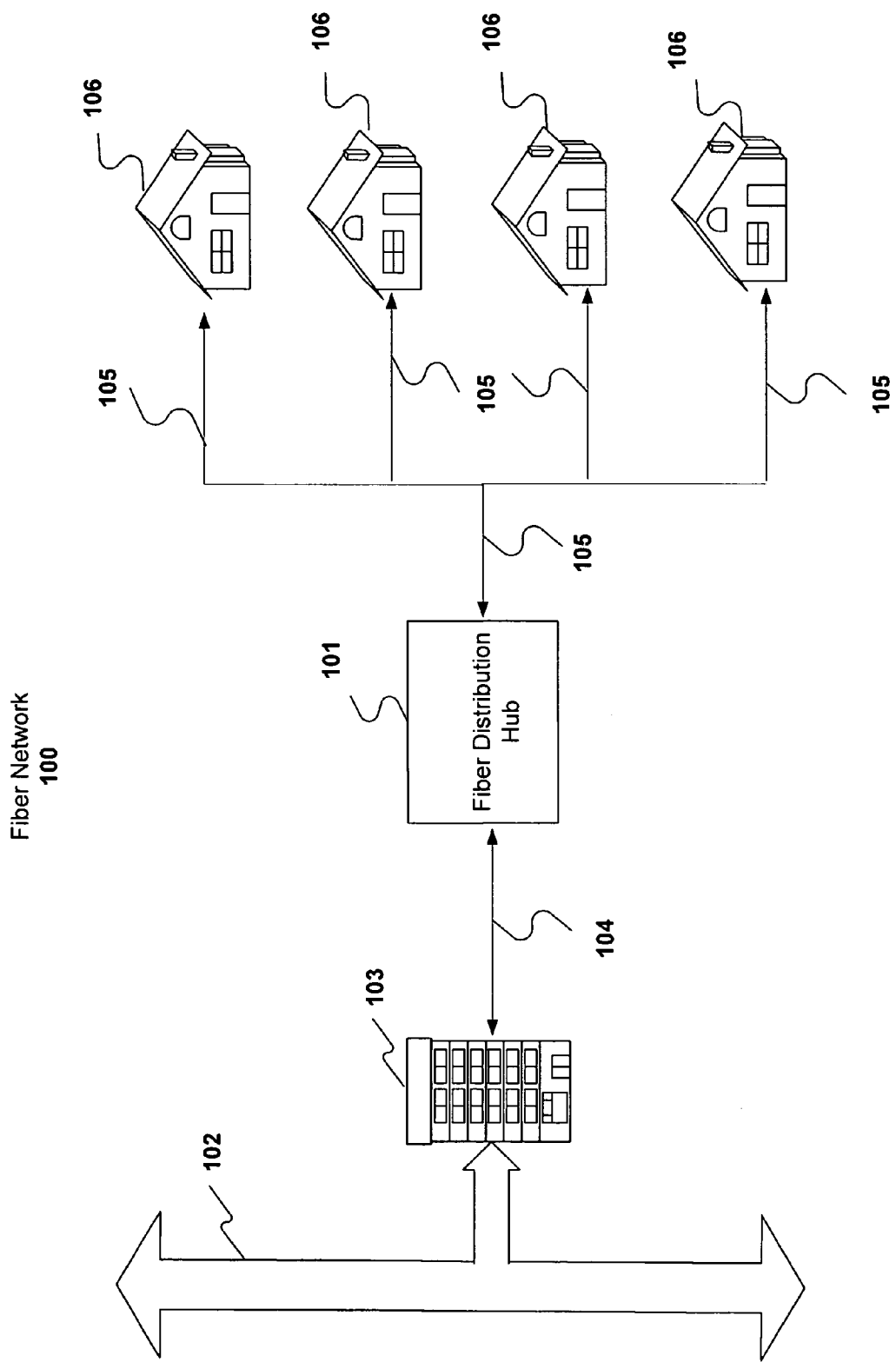

FIG. 1 includes a block diagram of an exemplary fiber network 100, consistent with certain aspects of the invention. Fiber network 100 may include a central office 103, connected to a backbone network 102, which typically includes optical fibers. Backbone network 102 is a relatively high-speed connection that transmits communication signals between central office 103 and other networks, such as the internet. Telephone, internet access, television, and other services may be available over backbone network 102.

Central office 103 is also connected to a fiber distribution hub 101 through a feeder cable 104. Fiber distribution hub 101 is, in turn, connected to subscriber buildings 106 by one or more distribution cables, 105. Feeder cable 104 and distribution cable 105 typically include fiber optic cables. Central office 103 contains known equipment for managing communications traffic between subscriber buildings 106 and backbone network 102. In passive optical network terminology, the central office 103 includes an "optical line terminal" or OLT which connects to feeder cable 104, and subscriber buildings 106 each include at least one "optical network terminals" or ONT, which connect to distribution cables 105.

Typically, subscriber buildings 106 each receive the same downstream traffic from central office 103. ONTs at subscriber buildings 106 can use address information provided in a data packet in the downstream traffic to determine which subscriber building 106 is intended to receive a particular data packet. Encryption can be used to prevent subscriber buildings 106 from unauthorized usage of packets intended for other subscriber buildings 106.

In order to manage upstream data traffic from subscriber buildings 106 to central office 103, central office 103 can allocate time slots to subscriber buildings 106. Subscriber buildings 106 typically only transmit their packets during a designated time slot, thereby avoiding so-called "collisions" on the fiber. The allocation of timeslots by the central office 103 can be done dynamically. Accordingly, if some of subscriber buildings 106 do not transmit packets, the upstream bandwidth can be allocated to other subscriber buildings 106.

As discussed above, conventional fiber distribution hubs are fully populated with distribution panels. As a result, the initial cost of the conventional fiber distribution hub allows for limited amortization of costs over time, and if a fiber distribution hub with excess distribution panel capacity is deployed, typically the cost of the hub cannot be recovered. Regardless of whether a full-capacity hub or a lower-capacity hub is chosen, risks are incurred.

Fiber distribution hub 101 will next be described with reference to FIG. 2. Fiber distribution hub 101 can be used to connect central office 103 to subscriber buildings 106 in the manner similar illustrated in FIG. 1, by providing an optical connection between distribution cables 105-1 and feeder cable 104. In the example as shown in FIG. 2, fiber distribution hub 101 is illustrated in a configuration for providing service to as many as 72 subscriber buildings 106.

To provide the optical connection between feeder cable 104 and distribution cables 105, fiber distribution hub 101 includes a splitter chassis 201 connected to feeder cable 104. Splitter chassis 201 can be used to split a signal in feeder cable 104 onto patch cables 202. Patch cables 202, in turn, can be connected to distribution panel 204-1, shown as 202-1. Distribution panel 204-1 then couples patch cables 202-1 to distribution cable 105-1.

Figure 2:
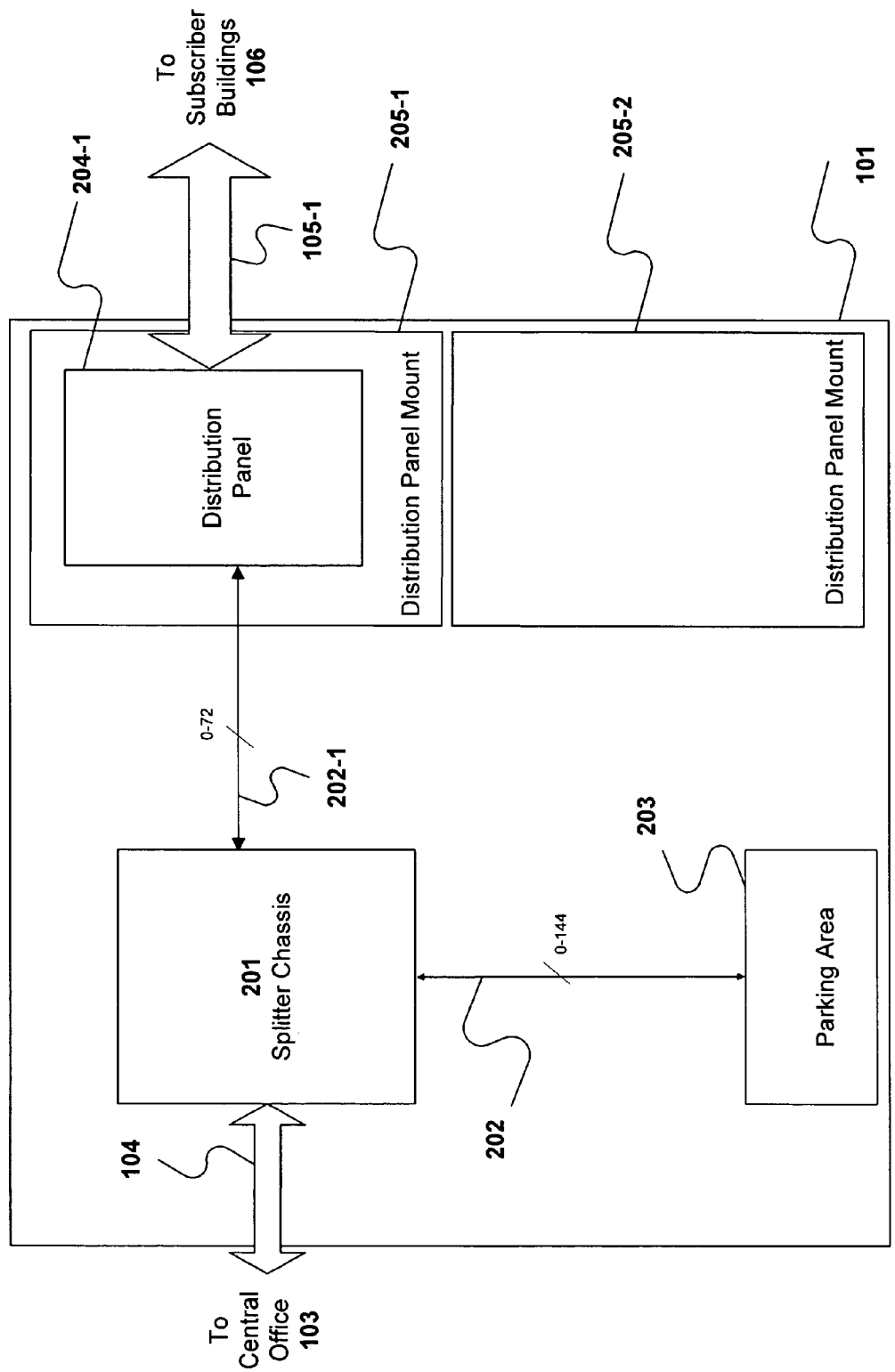
FIG. 2 illustrates a block diagram of an exemplary fiber distribution hub, consistent with certain aspects of the invention.

In the example shown in FIG. 2, distribution panel 204-1, mounted in distribution panel mount 205-1, is connected to up to 72 subscriber buildings 106 by distribution cables 105-1. One of subscriber buildings 106 is connected to one of distribution cables 105-1, through the splitter chassis 201, one of patch cables 202-1, and distribution panel 204-1, and thus to the central office 103. If such a connection does not exist, subscriber building 106 cannot receive communication signals from central office 103.

Figure 3:
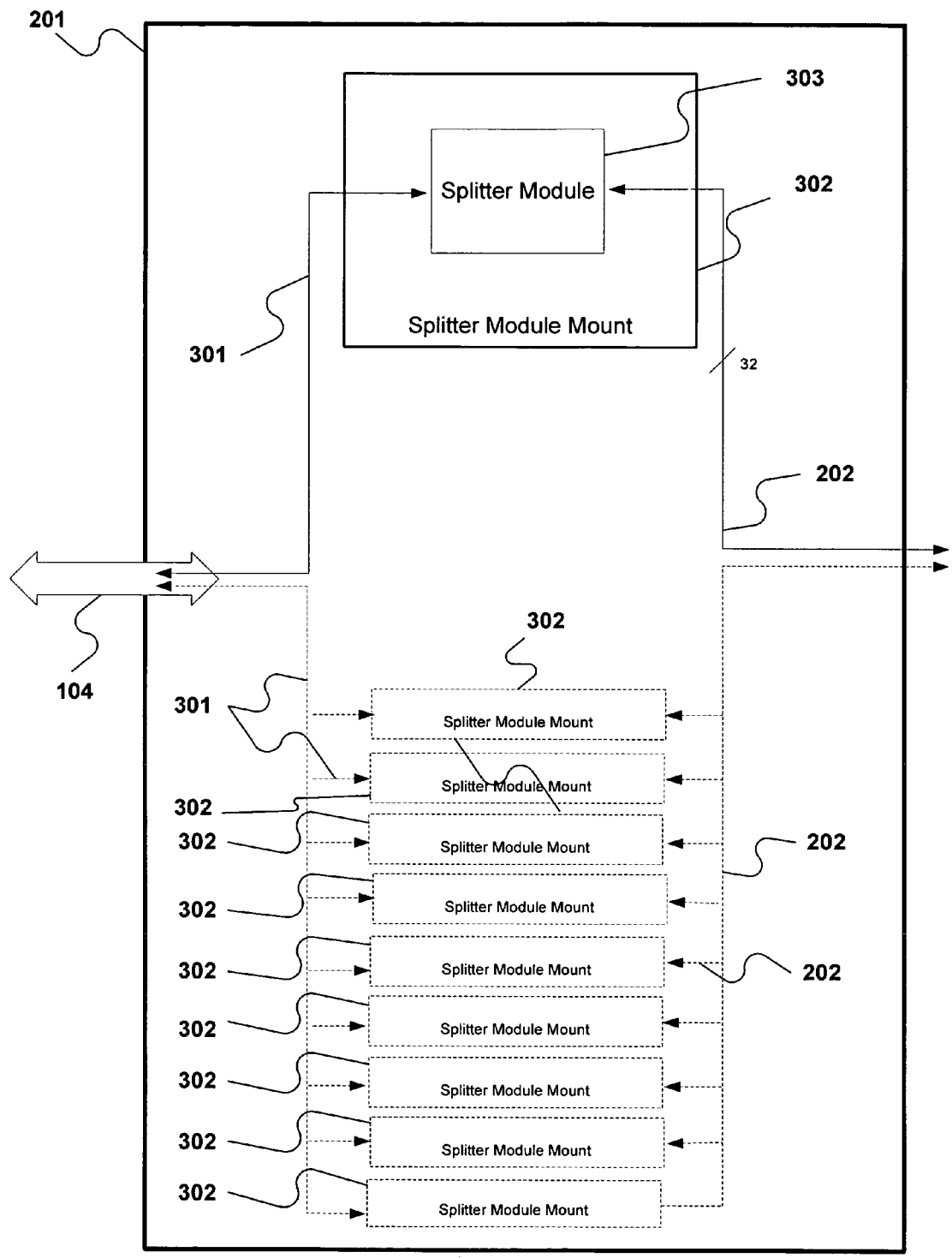
FIG. 3 illustrates a block diagram of an exemplary splitter chassis, consistent with certain aspects related to the present invention.

Turning to FIG. 3, feeder cable 103 can have multiple feeder cable strands 301 running from central office 103 to fiber distribution hub 101. The signal on each of these strands is generally split onto multiple patch cables 202. The splitting is accomplished in the splitter chassis 201. FIG. 3 is a block diagram of splitter chassis 201.

Splitter chassis 201 can contain a number of splitter module mounts 302. If a splitter module mount 302 contains a splitter module 303 (such as, for example, a splitter cassette or other device containing optical splitters), feeder cable strand 301 can be split into, for example, 32 different patch cables 202. If a 33rd subscriber building 106 requires service, a second splitter module 303 can be added to split the signal from another feeder cable strand 301 onto 32 more patch cables 202.

Figure 4:
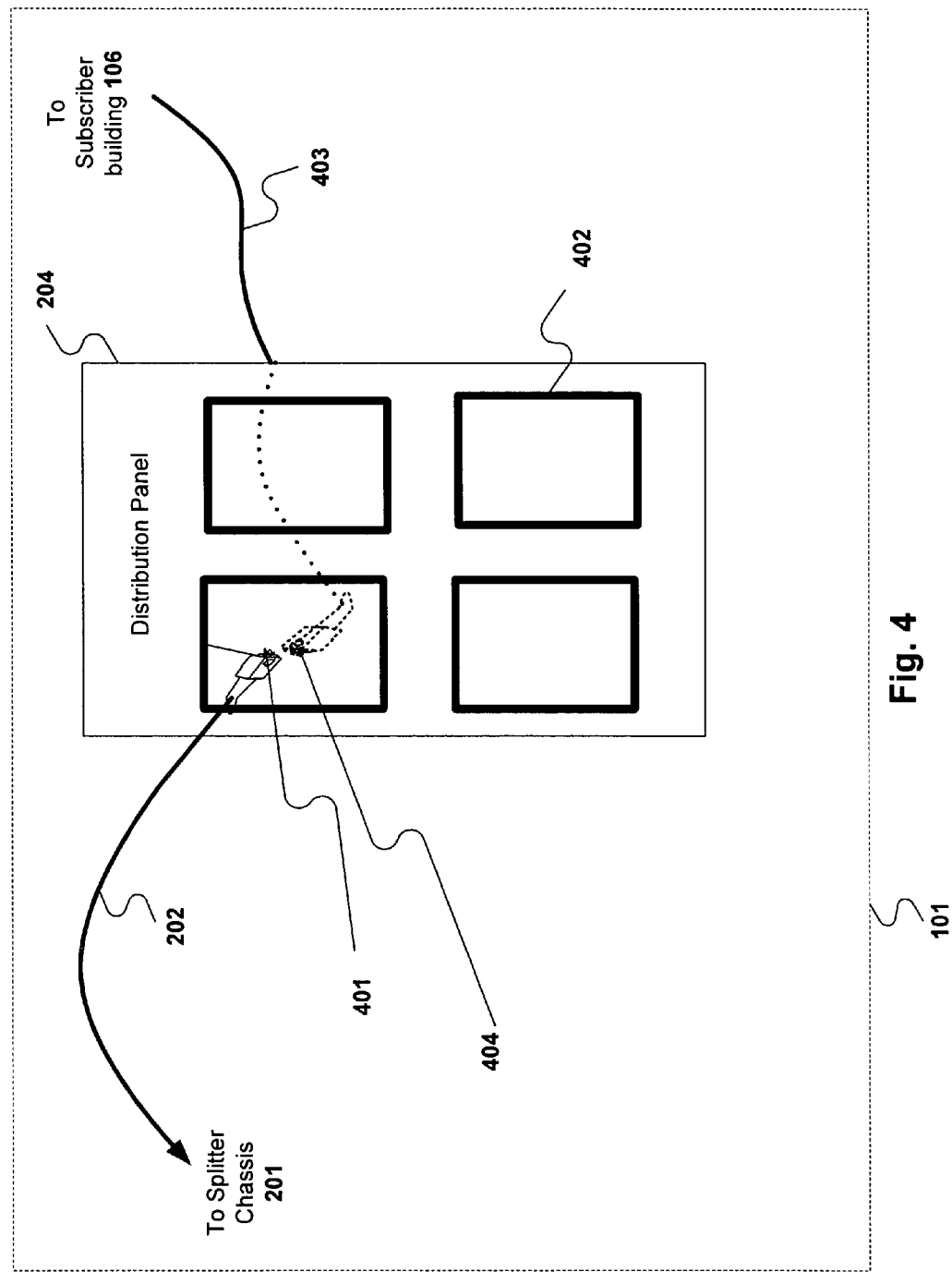
FIG. 4 illustrates a block diagram of an exemplary fiber distribution hub, consistent with certain aspects related to the present invention.

Patch cables 202 facilitate enabling or disabling fiber service to subscriber buildings 106 by connecting to distribution panel 204 as shown in FIG. 4. Distribution panel 204 is shown with four distribution panel connecting ports 402, but the actual number will typically correspond to the capacity of distribution panel 204, i.e. the number of subscriber buildings 106 that can be connected through distribution panel 204. Each of distribution panel connecting ports 402 can correspond to a particular strand of fiber within distribution cable 105, shown as distribution cable strand 403. One distribution cable strand 403 can run from each subscriber building 106, in distribution cable 105, to distribution panel 204. As shown in FIG. 1, distribution panel 204-1 has the capacity to provide 72 subscriber buildings 106 with service, and therefore has 72 ports.

Figure 5:
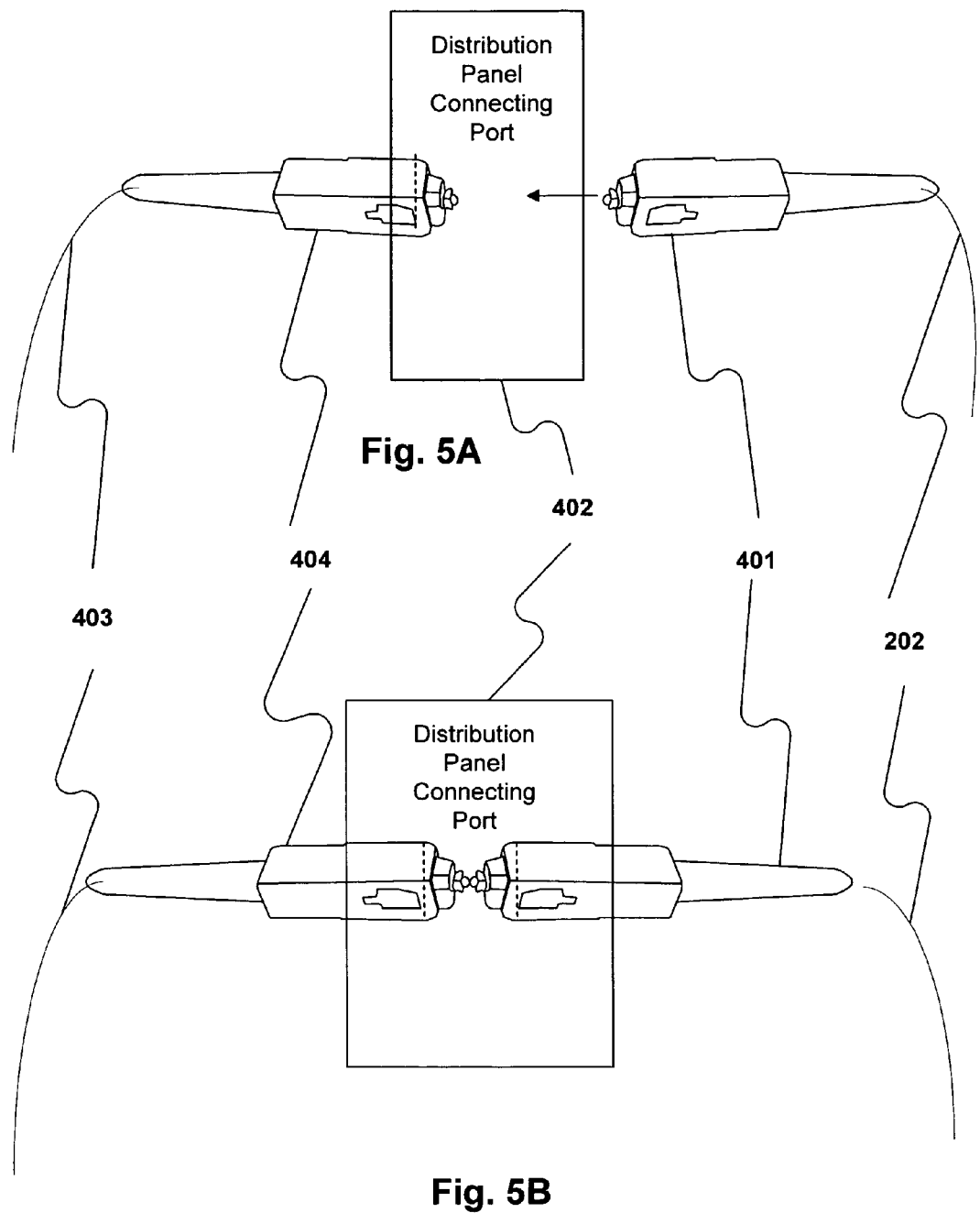
FIG. 5A illustrates a distribution panel connecting port, consistent with certain aspects related to the present invention.
FIG. 5B illustrates a distribution panel connecting port, consistent with certain aspects related to the present invention.

In one exemplary configuration, a suitable connector is provided at distribution cable strand 403 within distribution cable 105, such that each is preterminated with a distribution cable strand termination 404, and attached to the back of distribution panel 204 (often called a "backplane") as further shown in FIG. 4. In this configuration, each location in distribution panel 204 where a distribution cable strand termination 404 is located corresponds to a distribution panel connecting port 402. Termination 401 and 404 are discussed in greater detail below with respect to FIGS. 5 and 5B. Patch cables 202 can be "preterminated" with a patch cable termination 401 that is compatible with distribution cable strand termination 404. Terminations 401 and 404 are discussed in greater detail below with respect to FIGS. 5A and 5B.

To enable service to a particular subscriber building 106, a patch cable 202 is connected between splitter chassis 201 and distribution panel connecting port 402 corresponding to a particular subscriber building 106. On the other hand, if service is not enabled for a particular subscriber building 106, there will be no patch cable 202 connected to the distribution panel connecting port 402 for that subscriber building 106. A parking area 203, shown in FIG. 2, is provided for storing the patch cables 202 that are not connected to the distribution panel 204.

FIG. 5A illustrates how a connection between a patch cable 202 and distribution cable strand 403 is made in greater detail. Distribution cable strand termination 404 and patch cable termination 401 are shown as SC/APC connectors, however, any suitable optical connector can be used. As further shown in FIG. 5A, distribution strand cable termination 404 can be installed in distribution panel connecting port 402. In this configuration, a subscriber building 106 connected to distribution cable strand 403 will not have an optical connection in fiber hub 101. As shown in FIG. 5B, by simply connecting the patch cable termination 401 to distribution cable strand termination 404 at distribution panel connecting port 402, a connection can be made within fiber hub 101.

Distribution cable strand termination 404 and patch cable termination 401 may include a known optical connector, such as a subscriber connector ("SC"), which is used to connect single fibers. As noted above, in a preferred embodiment, the SC connector is an "SC/APC connector." "APC" means "angled physical contact" connector, and has better reflectance due to an angled polish on the connector. By using angled (SC/APC) connectors, it is possible to reduce the reflective loss at the connection between the two SC connectors, resulting in increased fidelity of the optical signal. This, in turn, enables more effective use of the connection for applications which are more sensitive to optical losses, such as video. "SC" connectors can also be "PC" connectors, or "physical contact" connectors, consistent with another embodiment.

Returning to FIG. 2, distribution panel 204-1 is mounted in distribution panel mount 204-2. Distribution panel mount 205-2, however, does not contain a distribution panel. As noted above, in this configuration, fiber distribution hub 101 has a capacity to provide service to up to 72 subscriber buildings 106, i.e. the capacity of distribution panel 204-1.

Scalability of fiber distribution hub 101, will next be described with reference to FIG. 6. If, for example, more than 72 subscriber buildings 106 are to be connected to fiber distribution hub 101, an additional distribution panel 204-2 can be coupled to distribution panel mount 205-2.

Figure 6:
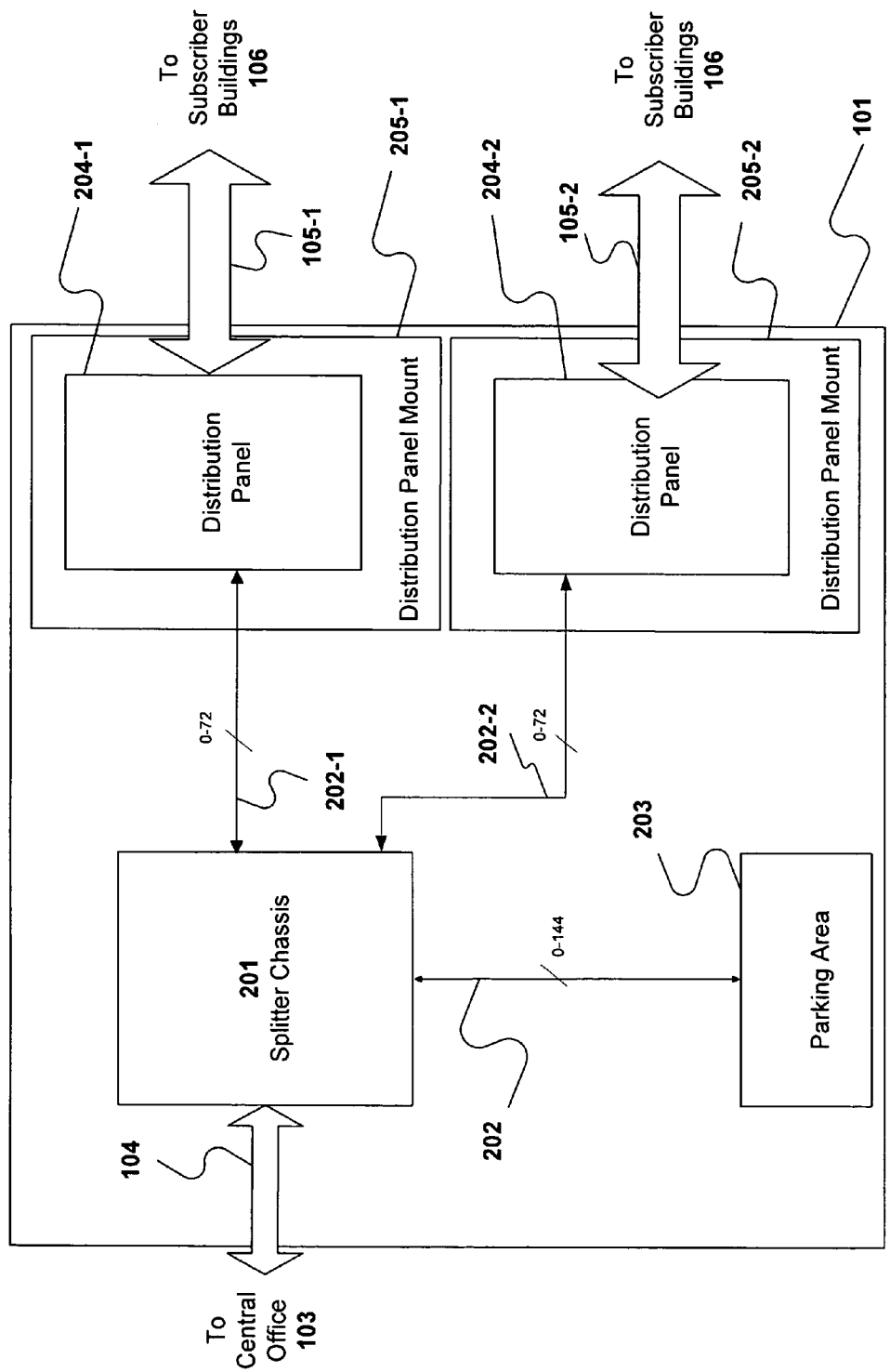
FIG. 6 illustrates a block diagram of an exemplary fiber distribution hub, consistent with certain aspects related to the present invention.

As further shown in FIG. 6, patch cables 202-2 can be connected to distribution panel 204-2. By connecting patch cables 202-2 between splitter chassis 201 and distribution panel 204-2, additional distribution cables 105-2 are connected to feeder cables 104 via distribution panel 204-2, patch cables 202-2, and splitter chassis 201.

Distribution panel 204-2 can accommodate an additional 72 distribution cables 105-2 and patch cables 202-2. Accordingly, with the addition of distribution panels 204-2, 72 more subscribers can be connected to fiber distribution hub 101. Therefore, in the example shown in FIG. 6, the total number of subscriber buildings 106 that can be connected to fiber distribution hub 101 is 144.

Figure 7:
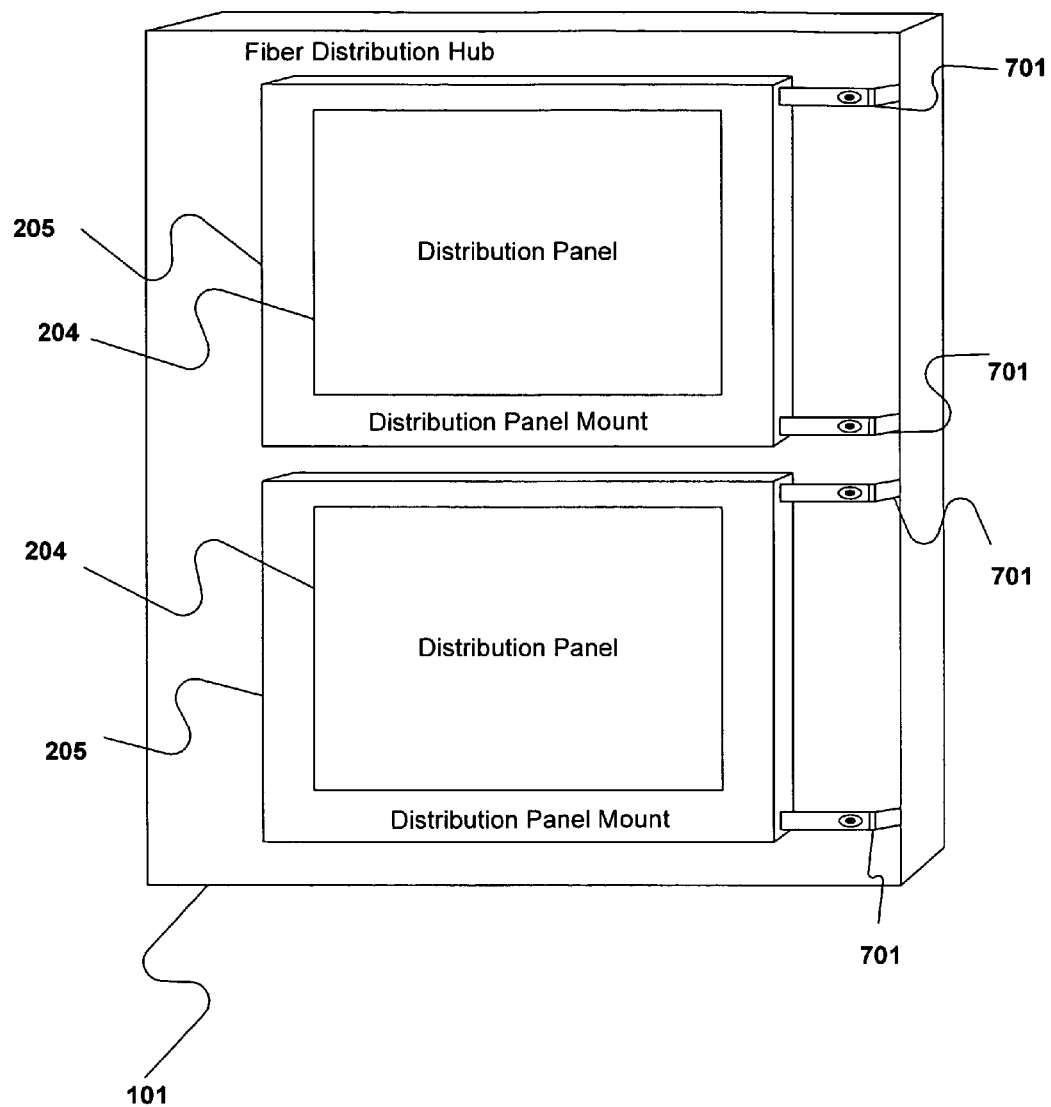
FIG. 7 illustrates a block diagram of an exemplary fiber distribution hub, consistent with certain aspects related to the present invention.

In a preferred embodiment, as illustrated in FIG. 7, the distribution panel mount 205 can be hinged to fiber distribution hub 101 using a distribution panel hinge 701. This configuration allows distribution panel mount 205 to swing out from fiber distribution hub 101 for easy access to distribution panel 204. Alternately, distribution panel 204 itself can be hinged in which case the distribution panel mount can itself constitute a hinge. The distribution panel mounting point can also take the form of other mechanical provisions that allow for mounting distribution panels in a fiber distribution hub.

In another embodiment, distribution cable strands 403 are preconnectorized within distribution cable 105 with MT (mechanical transfer) connectors. MT connectors can be used to connect multiple fibers together using a single connector. In the example shown in FIG. 6, distribution cable strands 403-1 connected to subscriber buildings 106 can be aggregated using an MT connector 801-1, and distribution cable strands 403-2 connected to distribution panel 204 can be aggregated in a similar manner using MT connector 801-2. Moreover, in FIG. 8, 12 distribution cable strands 403 within distribution cable 105 can be connected by joining MT connectors 801 with MT bulkhead alignment sleeve 802. Although 12 fiber strands are aggregated in this example, connectors that aggregate any appropriate number of fibers can be used.

Known distribution cables are normally provided with SC/APC connectors for connecting directly to a distribution panel, without using MT connectors. Thus, when a fiber distribution hub is installed, each distribution cable strand must be connected at the distribution panel. By providing fiber hubs containing distribution panels with distribution cable 105-2 aggregated in the manner described above, a fiber hub can be installed without having to manually connect each individual distribution cable strand. This technique also eases the installation of distribution panels in scalable fiber distribution hubs.

As illustrated above with respect to FIGS. 4 and 5, fiber distribution hub 101 can be initially deployed with less than a full complement of distribution panels 204, and can be populated with additional distribution panels as needed. By using fiber distribution hub 101, it is possible to implement an improved method for delivering service to a subscriber building.

Figure 10:
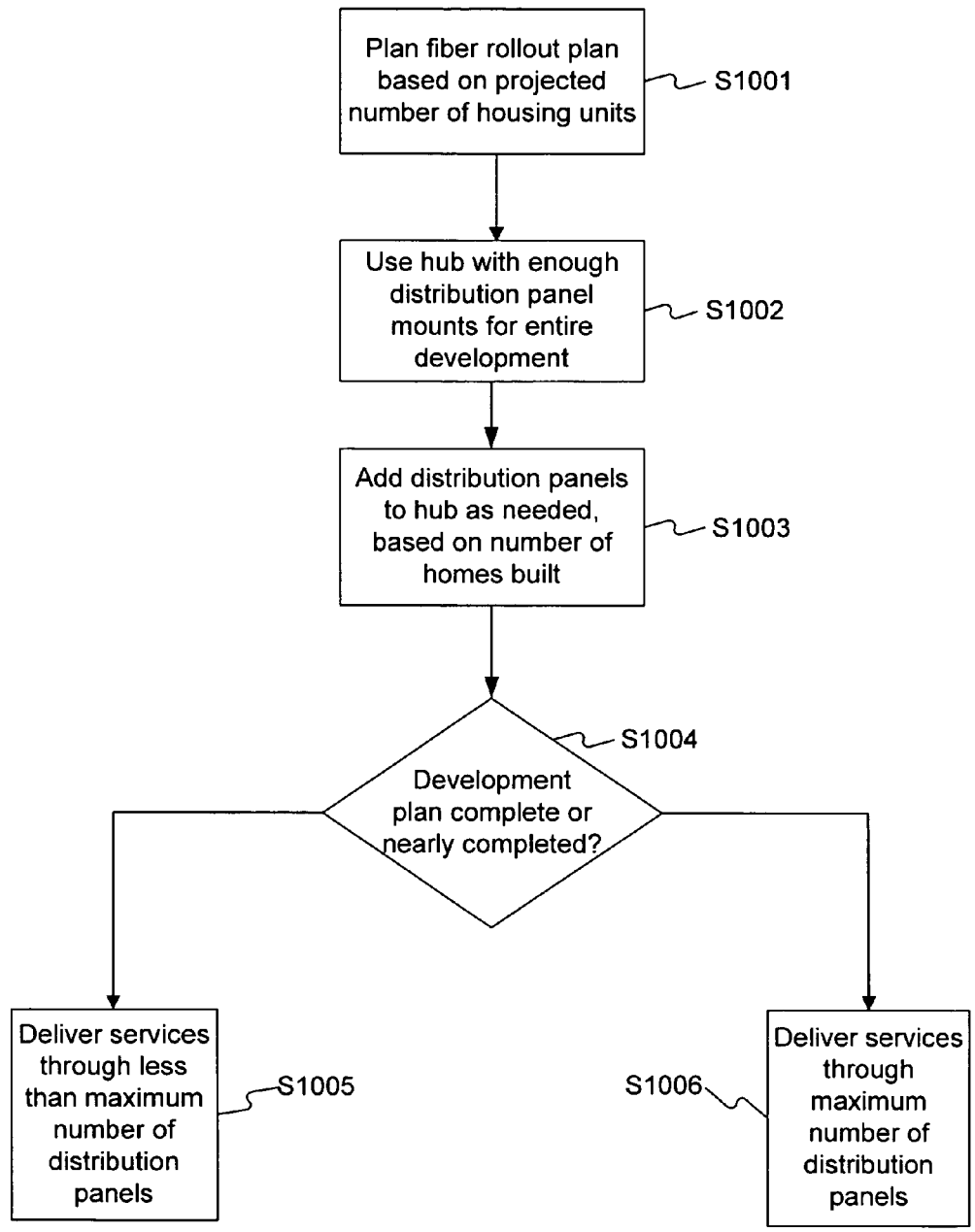
FIG. 10 is a flowchart of a method for deploying fiber services to subscribers in a neighborhood, consistent with certain aspects related to the present invention.

FIG. 10 is a flowchart 1000 of a preferred method for using a fiber distribution hub 101 to transmit and receive telecommunication signals from subscriber buildings 106, consistent with another embodiment. At step S1001, a fiber rollout for a development, for example, is planned, based on the projected number of subscriber buildings 106.

At step S1002, a hub is selected with sufficient capacity to provide service to the number of projected subscriber buildings 106 in a development, for example. Because there is minimal cost associated with using extra distribution panel mounts such as 205-2, the hub is constructed to include an adequate number of distributed panel mounts to accommodate future capacity needs of the development.

At step S1003, distribution panels are added to the fiber distribution hub 101 as capacity requirements increase. If fiber costs continue to decrease, the delayed acquisition of the fiber components within distribution panels 204 represents a costs savings over conventional fiber distribution hubs. As discussed above, if the distribution panel and distribution cable are both preconnectorized, this process can be even less labor- and time-consuming than would be the case with prior art fiber distribution hubs.

At step S1004, the development plan may eventually be completed, or may fail to materialize. If the development plan is completed, the method goes to step S1005, otherwise, the method goes to step S1006.

At step S1005, services are delivered to the completed development using the maximum number of distribution panels through fiber distribution hub 101, which is properly sized for the completed development. Most likely, distribution panels such as 204-2 acquired later during the course of the development cost less than those acquired early on, and a concurrent cost savings is achieved.

At step S1006, services are delivered to the development through fiber distribution hub 101, using less than the maximum number of distribution panels. Even though the anticipated number of subscriber buildings 106 has not materialized, fiber distribution hub 101 is still appropriately sized for the development, because it contains only enough distribution panels to service the existing subscriber buildings 106.

Note that regardless of the number of subscriber buildings 106, it is possible to tailor fiber distribution hub 101 to support the requisite number of connections. So long as the number of subscriber buildings 106 can be accommodated with the mounts provided in the hub, no additional hubs are required. Accordingly, costs can be reduced.

Figure 8:
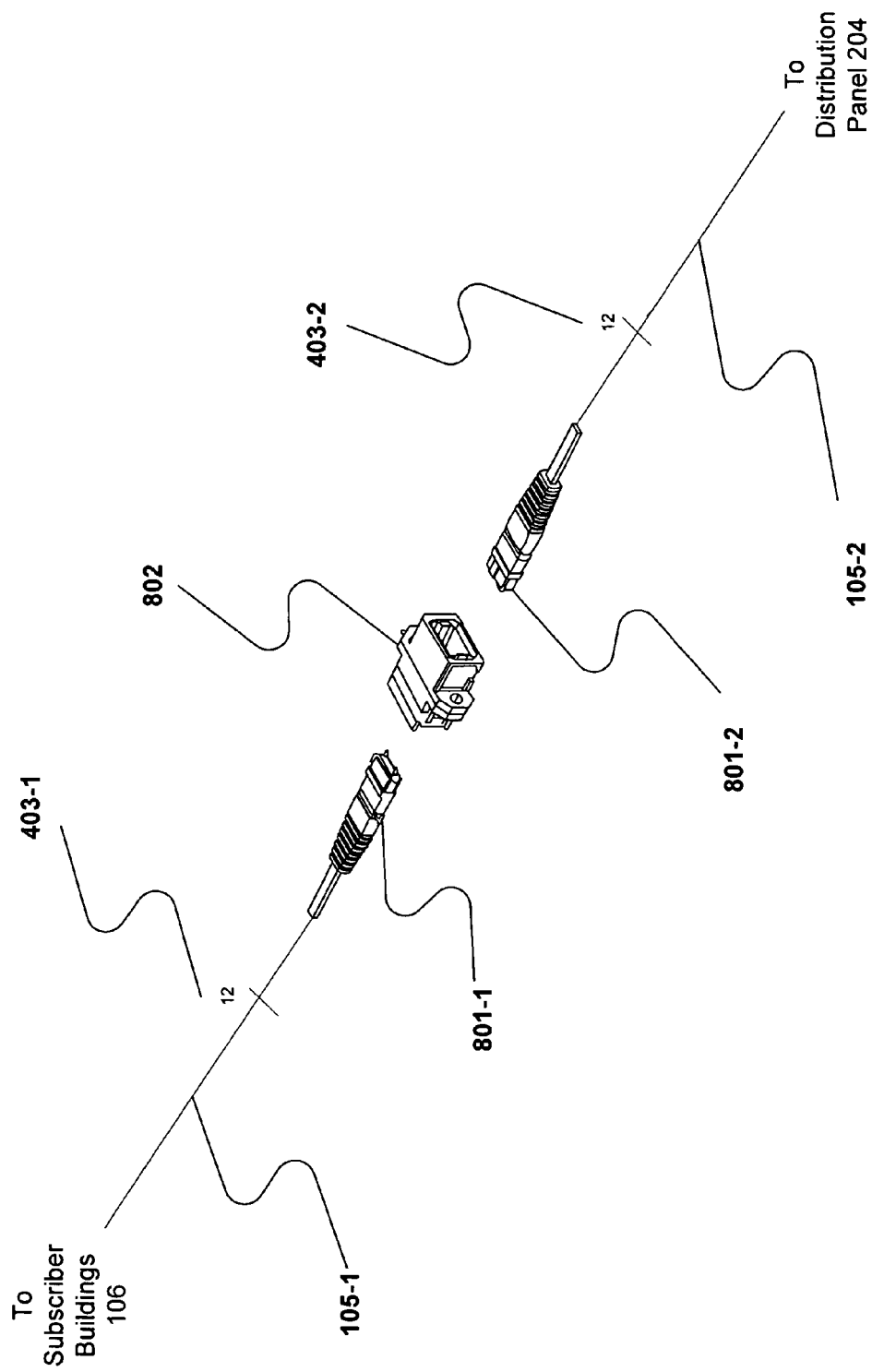
FIG. 8 illustrates an MT connector, consistent with certain aspects of the present invention.
Figure 9:
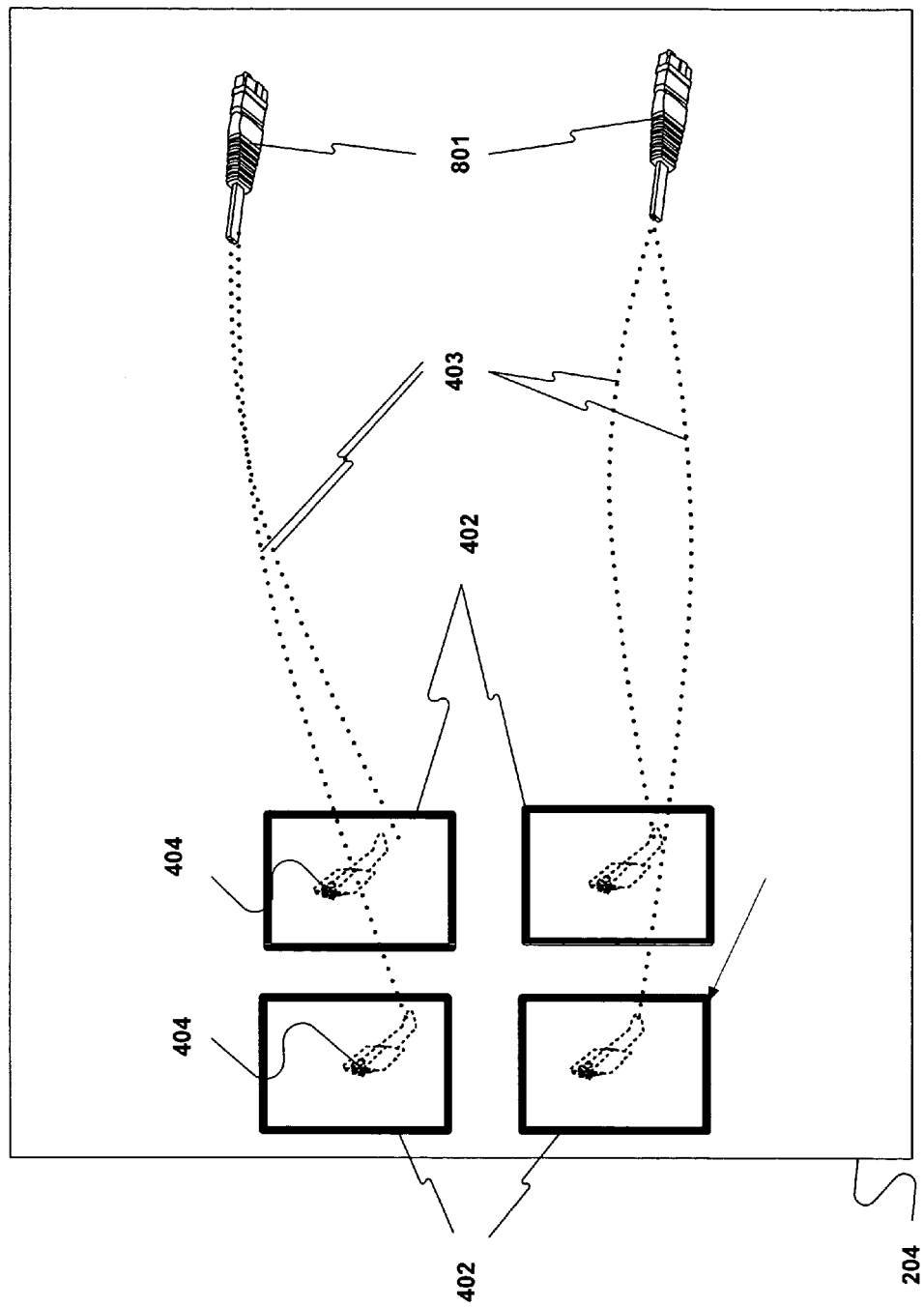
FIG. 9 illustrates a distribution panel, consistent with certain aspects of the present invention.
Figure 11:
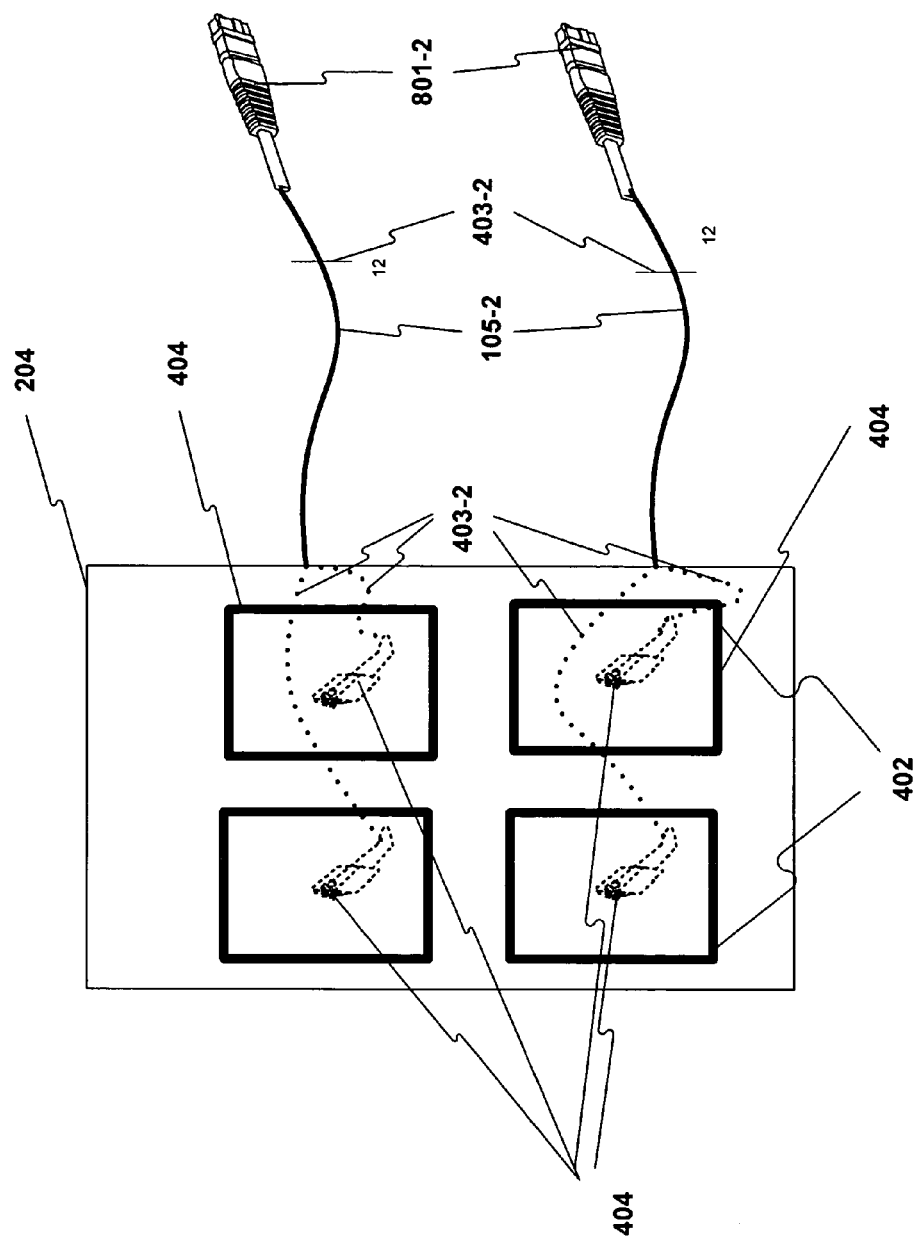
FIG. 11 illustrates a distribution panel, consistent with certain aspects of the present invention.

The method described above can be implemented more easily by using fiber distribution panel 204 configured as shown in FIG. 11. FIG. 11 illustrates fiber distribution panel 204 as a module ready for convenient deployment in fiber distribution hub 101. By terminating distribution cable strands 403 at distribution panel 204, and aggregating them together with MT connectors 801-2, distribution panel 204 is readily installed in fiber distribution hub 101. If the distribution cable running through a neighborhood is preterminated with MT connector 801-1 (as shown in FIG. 8), all that is required to install distribution panel 204 is to mount it in fiber distribution hub 101, and connect or mate MT connectors 801-2 to corresponding MT connectors 801-1. Note that like previous figures, FIG. 11 for clarity does not illustrate all of the components actually used by distribution panel 204 if distribution panel 204 has a capacity of 72 connections. Fiber distribution hub 101 includes 72 distribution panel connecting ports 402, 72 distribution cable strand terminations 404, 72 distribution cable strands 403 and 6 MT connectors 801-2, such that each MT connector 801-2 is being used to aggregate 12 distribution cable strands 403. As described above, distribution panel 204 can be hinged, or can be mounted to hinges, on fiber distribution hub 101.

While the embodiment described above illustrates one or two 72-port distribution panels mounted in the fiber distribution hub 101, any appropriate number of mounts and ports can be provided. For example, a fiber distribution hub 101 could be deployed with 8 distribution panel mounts, each capable of receiving a 32-port distribution panel, for a total capacity of 256. Such a hub could be initially deployed with a complement of distribution panels corresponding, for example, to the number of subscriber buildings expected to be built in a predetermined time frame, e.g., the first year of the development. Thus, if 100 subscriber buildings are anticipated, the hub could be deployed in a configuration with 4 32-port distribution panels installed. At this point, the hub would be capable of servicing 128 subscriber buildings. If more than 128 subscriber buildings will need service within the year, a corresponding number of distribution panels can be installed, depending upon the anticipated or actual demand for services. Known components, such as splitters and distribution panels, can be used in exemplary fiber distribution hubs 101. In addition, any appropriate number of distribution panels can be used.

Fiber distribution hubs 101 can be used in the manner described above to reduce the initial cost of providing fiber service to a neighborhood. The hub can be initially deployed with only as many of the relatively expensive distribution panels as are necessary. Preferably, the fiber distribution hub itself can be rather large, with enough of the relatively inexpensive distribution panel mounts to service even the most optimistic projections for the number of subscribers. Therefore, by installing a large hub, it is unlikely that an additional hub will need to be installed in the future, because the existing hub can be easily upgraded simply by installing additional distribution panels.

In contrast, because of the cost of high-capacity prior art fiber distribution hubs, the size of a hub installed in a given neighborhood must be more closely calibrated to the projected number of subscriber buildings. If the projections are too low, an additional hub will additionally need to be installed, which can in turn result in increased costs. These costs can be avoided by using a hub such as the preferred fiber distribution hub 101. As described above, additional distribution panels, rather than additional fiber distribution hubs, can be used to expand the capacity of a given fiber network. While this process is described above as being driven by new building construction, any indicator of future demand can be used to make decisions about when to install additional distribution panels in preferred fiber distribution hubs.

In the event subscriber building projections are too optimistic, further cost savings may be possible. For example, if the anticipated number of subscriber buildings does not materialize in a given neighborhood, for example, additional distribution panels are not required. In contrast, because of the costs of installing new hubs mentioned above, a known hub would typically be sized according to anticipated demand before all subscriber buildings are connected. Thus, the additional distribution panel capacity of a known hub is a substantial sunk cost that cannot be easily recouped if less than the expected number of subscriber buildings are actually connected to the hub.

As described above, the preferred fiber distribution hubs provide costs savings in several ways. These include avoiding the sunk costs associated with over-capacity prior art hubs, the future costs of adding prior art hubs to supplement under-capacity hubs, and the savings associated with delaying the purchase of distribution panels. The resultant savings can make fiber service deployment feasible and profitable in many neighborhoods that might be cost-prohibitive, or at least less profitable.

A specific exemplary embodiment has been described above. This preferred embodiment has been described as operating in a relatively limited environment, for the purposes of illustration. However, other embodiments are contemplated. For example, more than one preferred fiber distribution hub can be used in a given network. In addition, the preferred fiber distribution hubs can be used to supplement in networks with existing conventional hubs. There can be more than one central office. Service can be provided to multiple units within a single building, such as offices within an office building, rather than on the building-by-building basis described above. The services described, i.e. telephone, television, and data network, are simply examples of the types of services that can be provided over fiber. Any suitable service that can be provided over fiber can be used with the preferred fiber distribution hub. The preferred embodiments have also been discussed in a context where every building in a development is a subscriber building. However, some embodiments are also applicable when not all buildings have a distribution cable running to them, and in developments where not all buildings with distribution cables running to them necessarily subscribe to the fiber services. Embodiments consistent with the disclosed herein can be used in existing neighborhoods to provide fiber services to both residences and office buildings. Even where new building construction is not ongoing, it can be advantageous to install a preferred fiber distribution hub, if it is anticipated that demand for telecommunications service provided over optical fiber will increase in the area serviced by the hub. In short, the preferred fiber distribution hub is advantageous relative to the prior art when there is uncertainty over the number of buildings that may eventually be connected to a fiber distribution hub.

There are a variety of different conventional techniques for building fiber distribution hubs which are compatible with the examples disclosed herein. Among these, feeder cable or distribution cable fibers can be connected, for example by splicing, to the hub, and these connections can be made inside or outside of the hub. Also, there is no restriction on the number of optical splitters that a given module can be built to utilize, or the total number of splitters in a splitter module. The splitter modules can be, for example, splitter cassettes, or any other means available for conveniently packaging optical splitters.

The systems and methods disclosed herein may be embodied in various forms of apparatus, and in both indoor and outdoor environments. Embodiments according to the present invention are not inherently related to any particular computer, network, architecture, environment, or other apparatus.

Various modifications and variations can be made in the preferred embodiments described herein without departing from the scope of the invention as set forth in the appended claims. Other embodiments will be apparent from consideration of the preferred embodiments described herein. It is intended that the specification and examples be considered as exemplary only, with a true scope of the invention being indicated by the following claims and their equivalents.

What is claimed is:

1. A method comprising:
   determining a demand for fiber services in an area;
   installing a fiber distribution hub including a first distribution panel mount and a second distribution panel mount, the first distribution panel mount and the second distribution panel mount being included in the fiber distribution hub based on the determined demand for fiber services in the area;
   attaching, based on the determined demand for fiber services in the area, a first distribution panel to the first distribution panel mount, the first distribution panel including a plurality of distribution panel connecting ports, and the second distribution panel mount being devoid of an associated second distribution panel based on the determined demand for fiber services in the area;
   connecting the first distribution panel to a plurality of subscriber buildings, in the area, through a first group of strands of a distribution cable, the distribution cable also including a second group of strands;
   connecting the fiber distribution hub to a central office through a feeder cable; and
   aggregating the second group of strands of the distribution cable using a first single connector while the second distribution panel mount is devoid of the second distribution panel, such that the aggregated second group of strands can be readily connected to a second single connector for an aggregated group of strands, from the second distribution panel, by using the first single connector upon installation of the second distribution panel in the second distribution panel mount.

2. The method according to claim 1 further comprising:
   determining whether the demand for fiber services in the area has increased;
   attaching the second distribution panel to the second distribution panel mount, based on determining that the demand for fiber services in the area has increased, where the aggregated second group of strands from the second distribution panel connect to multiple distribution panel connecting ports on the second distribution panel; and
   joining the aggregated second group of strands, from the second distribution panel, to the second group of strands, of the distribution cable, to connect the second distribution panel to another plurality of subscriber buildings through the aggregated second group of strands using the first single connector and the second single connector.

3. The method according to claim 1, where the first single connector is a mechanical transfer (MT) connector and the second single connector is an MT connector.

4. The method according to claim 3, where the first single connector and the second single connector are angled.

5. A method comprising:
   determining a projected number of subscriber buildings;
   installing a fiber distribution hub including a plurality of distribution panel mounts, the plurality of panel mounts being based on the determined projected number of subscriber buildings;
   mounting a distribution panel in a distribution panel mount, of the plurality of distribution panel mounts, based on a number of subscriber buildings, of the projected number of subscriber buildings, the distribution panel comprising a backplane including a plurality of distribution panel connecting ports;
   aggregating a plurality of fibers connected to the plurality of distribution panel connecting ports using a first mechanical transfer (MT) connector;
   aggregating a plurality of distribution cable fibers with a second MT connector, where the plurality of distribution cable fibers are part of a distribution cable serving a plurality of subscriber buildings;
   connecting the distribution panel to the aggregated plurality of distribution cable fibers by using a MT bulkhead alignment sleeve to join the first MT connector and the second MT connector;
   determining whether the number of subscriber buildings has increased; and
   mounting a second distribution panel in a second, different distribution panel mount, of the plurality of distribution panel mounts, based on determining that the number of subscriber buildings has increased.

6. The method according to claim 5, further comprising connecting a patch cable to at least one of the plurality of distribution ports on the distribution panel, thereby establishing an optical connection between a feeder cable and the distribution cable.

7. The method of according to claim 3, where the first single connector and the second single connector are joined with an MT bulkhead alignment sleeve.

8. The method of according to claim 5, where the projected number of subscriber buildings corresponds to a projected number of subscriber buildings in a housing development, and where the number of subscriber buildings corresponds to a number of existing subscriber buildings in the housing development.

9. The method of according to claim 8, where the second distribution panel is mounted based on determining that the number of existing subscriber buildings has increased a first time,
   the method further comprising:
   determining whether the number of existing subscriber buildings has increased a second time;
   mounting a third distribution panel in a third, different distribution panel mount, of the plurality of distribution panel mounts, based on determining that the number of existing subscriber buildings has increased the second time.

10. The method of claim 1, where the demand for fiber services in the area is based on a projected number of subscribers in a housing development, and where the fiber distribution hub is installed with a plurality of distribution panel mounts based on the projected number of subscribers in the housing development.

11. The method of claim 10, where the first distribution panel is attached to the first distribution panel mount based on a number of existing subscribers in a housing development.

12. The method of claim 11, where the second distribution panel is attached to the second distribution panel mount based on an increase of the number of existing subscribers in the housing development.

* * * * *